United States Patent Office 3,173,950
Patented Mar. 16, 1965

3,173,950
PREPARATION OF ALICYCLIC AMINES
George A. Buntin, Wilmington, Del., assignor to Hercules Powder Company, Wilmington, Del., a corporation of Delaware
No Drawing. Filed Aug. 14, 1962, Ser. No. 216,730
5 Claims. (Cl. 260—563)

This invention relates to a method of producing cyclic amines.

In accordance with the present invention it has been found that amines of the formula

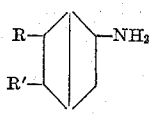

where R and R' taken individually represent a member of the group H, Cl and $C_1$–$C_4$ alkyl and where R and R' taken together represent —$CH_2$—$CH_2$—$CH_2$— are produced by reacting a compound of the formula

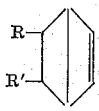

where R and R' taken individually are as set forth above and R and R' taken together represent

—CH=CH—$CH_2$— with nitrosyl chloride to form the nitrosochloride thereof and contacting the nitrosochloride with hydrogen and a hydrogenation catalyst at hydrogenation temperature until the said amine is produced.

Compounds of the formula

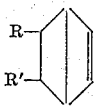

are produced by reacting cyclopentadiene by the Diels-Alder reaction with the desired olefin of the formula RCH=CHR' where R and R' have the same values as in the Diels-Alder adduct produced. Representative compounds produced are norbornene, monochloronorbornene, dichloronorbornene, methyl norbornene, dimethyl norbornene, dicyclopentadiene, ethyl norbornene and methyl chloronorbornene.

Nitrosyl chloride is added to the unsaturated compound at temperatures in the range of 0–100° C. in an organic solvent, and the nitrosyl chloride adduct is recovered by distilling off the solvent. Solvents which are useful are: acetic acid and chlorinated hydrocarbons, volatile alcohols, and volatile aliphatic hydrocarbons. $C_1$–$C_6$ alcohols and mixed hydrocarbons selected from the $C_5$ to $C_{10}$ range are particularly suitable.

The nitrosyl chloride adducts have the formula

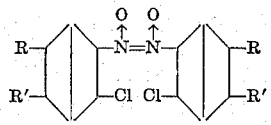

and on hydrogenation are cleaved at the nitrogen-nitrogen linkage as well as at the chlorine-carbon linkage. The hydrogenation is continued in this process until both cleavage reactions are completed. The vicinal chlorine is readily removed by hydrogenolysis under the conditions of this process while the R and R' groups are unaffected as to hydrogenolysis.

The hydrogenation of the nitrosyl chloride adduct is carried out by heating the nitrosyl chloride adduct in an inert solvent at 50–250° C. and preferably at 100–150° C. with a base metal hydrogenation catalyst or a noble metal hydrogenation catalyst and an adequate amount of hydrogen. Solvents which are useful are the aliphatic alcohols ($C_1$–$C_6$) and the lower fatty acid esters thereof ($C_2$–$C_4$ acids), saturated acyclic or cyclic hydrocarbons ($C_5$ to $C_{10}$), ethers of the $C_1$ to $C_5$ alcohols, and cyclic ethers such as dioxane. The base metal hydrogenation catalysts include Raney nickel, Raney cobalt and nickel or cobalt on any of the usual supports such as kieselguhr, silica and the like. The noble metal catalysts include palladium and platinum which are preferable to other noble metal hydrogenation catalysts. These noble metal catalysts are used in the elementary form and may be prepared by usual methods of reduction of the oxide or a noble metal salt. The noble metal catalysts may also be used on the usual supports such as silica, carbon, alumina, and the like. The amount of catalyst required for completing the reduction of the —NO group and hydrogenolysis of the vicinal chloride is not critical and only an effective catalytic amount is necessary. As little as 1% catalyst based on the nitrosochloride is effective, and as much as 20% may be used for effecting the same reduction and hydrogenolysis. The hydrogenations may be carried out batchwise or continuously and the solution of nitrosochloride can be passed continuously through a fixed bed of the catalyst in the hydrogenation process if desired. The amount of hydrogen required is usually the theoretical amount plus an adequate excess sufficient to maintain a pressure of at least one atmosphere. Greater pressures are beneficial but not required.

The liberated hydrochloric acid produced in the process forms the hydrochloride salt of the amine unless some other acid acceptor is present. In the case of hydrogenation with a base metal catalyst it is desirable to have an inorganic acid acceptor present so as to maintain activity of the catalyst. Acid acceptors which may be used include ammonia, alkali and alkaline earth metal hydroxides or salts of carboxylic acids. Examples are sodium hydroxide, sodium carbonate, sodium bicarbonate, sodium acetate, calcium hydroxide, calcium carbonate or calcium oxalate.

The methods of carrying out the process of this invention are illustrated by the following examples in which parts and percentages are by weight.

*Example 1*

A solution of 200 parts dicyclopentadiene nitrosochloride in 300 parts isopropyl alcohol was placed in a stainless steel rocking autoclave with 40 parts 5% Pd on carbon catalyst under 4000 p.s.i. hydrogen pressure. The temperature was gradually raised and at 103° C. an exothermic reaction took place. The temperature rose to 150° C. and was held at that temperature for 3 hours. Prior to this time, the hydrogen pressure had ceased dropping indicating a completion of the reaction. The hydrogenation product was recovered by separating the catalyst and distilling off the isopropyl alcohol under reduced pressure. Tetrahydrodicyclopentadienylamine hydrochloride was obtained as a white crystalline residue. It was dissolved in 20% hydrochloric acid, washed with benzene to remove impurities and neutralized with 20% aqueous sodium hydroxide. The free amine was extracted with benzene and distilled. There was obtained 114 parts tetrahydrodicyclopentadienylamine which was a water-white liquid, B.P. 69–72° C./1 mm., $n_D^{20}$ 1.5200; analysis=9.05% N, neutral equivalent 153.6; (calculated 9.28% N, neutral equivalent 151). The acetamide of this amine melted at 145–147° C. and the picric acid salt melted at 225–227° C.

Example 2

Example 1 was repeated using a nickel catalyst, 65% nickel on kieselguhr (Girdler G49 catalyst). In this example 50 parts of dicyclopentadiene nitrosochloride in 160 parts isopropyl alcohol, 10 parts nickel catalyst and 20 parts sodium bicarbonate were charged into the autoclave and hydrogen at 4000 p.s.i. was introduced. The temperature was raised to 150° C. where it was held for 2.5 hours while the reaction completed itself. The amine recovered as in Example 1 amounted to 20 parts.

Example 3

The nitrosochloride of chloronorbornene was prepared by adding nitrosyl chloride to 5-chloronorbornene.

A solution of 170 parts of this nitrosochloride in 320 parts isopropyl alcohol was placed in a hydrogenation autoclave with 25 parts 5% Pd on carbon catalyst and the autoclave was charged with hydrogen to 4000 p.s.i. pressure. The temperature was raised to 100° C. and held at this temperature for 3.75 hours. The amine was recovered as in Example 1. There was thus obtained 35 parts 5-chloronorbornylamine, B.P. 56–65° C./1 mm. $n_D^{20}$ 1.5090; analysis: 23.1% Cl (calculated 24.3% Cl). This amine was converted to the isocyanate by reaction with phosgene. The isocyanate had a B.P. 75–78° C./1.5 mm. and $n_D^{20}$ 1.5039. When reacted with dimethylamine the isocyanate yielded 1,1-dimethyl-3-(chloronorbornyl) urea, M.P. 139–141° C., analyzing 12.7% N and 16.4% Cl (calculated 12.85% N and 16.35% Cl).

Example 4

Example 3 was repeated using 12.75 parts catalyst, 2000 p.s.i. hydrogen pressure at 110° C. for 11 hours whereby 52 parts 5-chloronorbornylamine was obtained.

Example 5

Norbornene nitrosochloride was prepared by addition of nitrosyl chloride to norbornene. A solution of 120 parts norbornene nitrosochloride in 160 parts isopropyl alcohol and 10 parts 5% Pd on carbon were placed in a stainless steel autoclave with hydrogen under 3500 p.s.i. pressure and the mixture was heated to 152° C. where it was held for 2.75 hours. The reaction was completed during this period. The amine was isolated from the salt produced in the reaction as in Example 1 and distilled. Its boiling point was 68–70° C./33 mm.

Example 6

A solution of 135 parts 5,6-dichloronorbornene nitrosochloride in 320 parts isopropyl alcohol was placed in an antoclave with 20 parts 5% Pd on carbon catalyst and hydrogen was added to 4000 p.s.i. This mixture was then heated to 106° C. and held at this temperature for 2.5 hours. The amine recovered as in Example 1 but not distilled amounted to 58 parts. The 5,6-dichloronorbornylamine so obtained was reacted with phosgene to form the isocyanate thereof which was a liquid boiling at 115–130° C./2 mm., $n_D^{20}$ 1.5279. The isocyanate on reaction with dimethylamine gave 1,1-dimethyl-3-(5,6-dichloronorbornyl) urea.

Example 7

5,6-dichloronorbornene was converted into the nitrosochloride by addition of nitrosyl chloride and 222 parts of this product in 520 parts isopropyl alcohol was placed in a stainless steel autoclave with 20 parts 5% Pd on carbon catalyst. This mixture was placed under 3200 p.s.i. pressure with hydrogen and agitated at 150° C. for 2 hours. The amine produced was then isolated as in Example 1. The recovered 5,6-dichloronorbornylamine amounted to 103 parts. By reacting this amine with phosgene to form the isocyanate and reacting the isocyanate with dimethylamine, there was produced 1,1-dimethyl-3-(5,6-dichloronorbornyl) urea.

The process of this invention provides an excellent and novel method for the production of substituted norbornylamines and particularly the 5,6-disubstituted norborylamines whose production by other methods is tedious and requires many more steps.

What I claim and desire to protect by Lettters Patent is:

1. The method of preparing an amine of the formula

where R and R' are selected from the group consisting of H, Cl, and $C_1$ to $C_4$ alkyl, in the case that R and R' are taken individually, and —$CH_2CH_2CH_2$—, in the case that R and R' are taken together, which comprises reacting a nitrosyl chloride adduct of a compound of the formula

where R and R' are selected from the group consisting of H, Cl, and $C_1$ to $C_4$ alkyl, in the case that R and R' are taken individually, and —$CH_2CH=CH$—, in the case that R and R' are taken together, with hydrogen in contact with a hydrogenation catalyst of the group consisting of platinum, palladium, nickel and cobalt under hydrogen pressure at 50–250° C. until said amine is produced.

2. The method of preparing tetrahydrodicyclopentadienylamine which comprises contacting the adduct formed by reacting dicyclopentadiene with nitrosylchloride to form the nitrosochloride thereof with hydrogen and a hydrogenation catalyst of the group consisting of platinum, palladium, nickel and cobalt under hydrogenation conditions at 50–250° C. until said amine is produced.

3. The method of preparing chloronorbornylamine which comprises contacting the adduct formed by reacting chloronorbornene with nitrosyl chloride to form the nitrosochloride thereof with hydrogen and a hydrogenation catalyst of the group consisting of platinum, palladium, nickel and cobalt under hydrogenation conditions at 50–250° C. until said amine is produced.

4. The method of preparing norbornylamine which comprises contacting the adduct formed by reacting norbornene with nitrosyl chloride to form the nitrosochloride thereof with hydrogen and a hydrogenation catalyst of the group consisting of platinum, palladium, nickel and cobalt under hydrogenation conditions at 50–250° C. until said amine is produced.

5. The method of preparing 5,6-dichloronorbornylamine which comprises contacting the adduct formed by reacting 5,6-dichloronorbornene with nitrosyl chloride to form the nitrosochloride thereof with hydrogen and a hydrogenation catalyst of the group consisting of platinum, palladium, nickel and cobalt under hydrogenation conditions at 50–250° C. until said amine is produced.

References Cited by the Examiner

Clemo et al.: J. Chem. Soc. (London), vol. of 1951, pp. 22–25.

Miller: J. Org. Chem., vol. 26, pp. 4905–4907 (1961).

Perrot et al.: Compt. rend., vol. 234, pp. 2617–2619 (1952).

Youngblood et al.: J. Org. Chem., vol. 23, pp. 684–686 (1958).

CHARLES B. PARKER, *Primary Examiner.*

JOSEPH P. BRUST, *Examiner.*

UNITED STATES PATENT OFFICE
CERTIFICATE OF CORRECTION

Patent No. 3,173,950                            March 16, 1965

George A. Buntin

It is hereby certified that error appears in the above numbered patent requiring correction and that the said Letters Patent should read as corrected below.

Column 1, lines 13 to 18, the formula should appear as shown below instead of as in the patent:

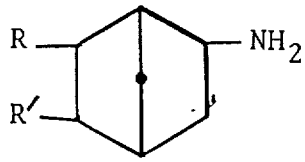

Same column 1, lines 23 to 27 and lines 37 to 41, the formulas, each occurrence, should appear as shown below instead of as in the patent:

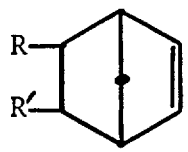

Same column 1, lines 60 to 64, the formula should appear as shown below instead of as in the patent:

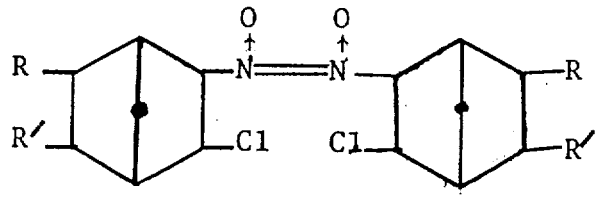

Signed and sealed this 17th day of August 1965.

(SEAL)
Attest:

ERNEST W. SWIDER
Attesting Officer

EDWARD J. BRENNER
                                      Commissioner of Patents